United States Patent
Takakura et al.

[11] Patent Number: 5,998,573
[45] Date of Patent: Dec. 7, 1999

[54] AMINO RESIN COMPOSITION

[75] Inventors: Makoto Takakura; Hiroyuki Uehara; Keisuke Nakayama; Yuko Furuya, all of Toyama-ken, Japan

[73] Assignee: Nissan Chemical Industries, Ltd., Tokyo, Japan

[21] Appl. No.: 09/043,245

[22] PCT Filed: Sep. 17, 1996

[86] PCT No.: PCT/JP96/02653

§ 371 Date: Mar. 16, 1998

§ 102(e) Date: Mar. 16, 1998

[87] PCT Pub. No.: WO97/11102

PCT Pub. Date: Mar. 27, 1997

[30] Foreign Application Priority Data

Sep. 18, 1995 [JP] Japan ................................ 7-238727

[51] Int. Cl.⁶ .......................... C08G 12/38; C08L 61/28; C09D 161/28; C09J 161/28
[52] U.S. Cl. .......................... 528/327; 528/230; 528/253; 528/254; 528/258; 528/261; 528/328; 525/509; 525/510; 525/512; 525/518; 524/100
[58] Field of Search .................... 528/327, 328, 528/254, 230, 253, 261, 258; 525/512, 518, 509, 510; 524/100

[56] References Cited

U.S. PATENT DOCUMENTS

| | | | |
|---|---|---|---|
| 2,228,161 | 1/1941 | Zerweck et al. | 528/327 |
| 5,328,978 | 7/1994 | Schön et al. | 528/327 |

FOREIGN PATENT DOCUMENTS

| | | |
|---|---|---|
| 524939 | 6/1954 | Belgium . |
| 542 360 | 5/1993 | European Pat. Off. . |
| 596 309 | 5/1994 | European Pat. Off. . |
| 1075670 | 10/1954 | France . |
| 889 593 | 7/1953 | Germany . |
| 42-5115 | 3/1942 | Japan . |
| 3-215564 | 9/1991 | Japan . |
| 5-331252 | 12/1993 | Japan . |
| 6-211955 | 8/1994 | Japan . |
| 8-27125 | 1/1996 | Japan . |
| 8-27128 | 1/1996 | Japan . |
| 8-193071 | 7/1996 | Japan . |

OTHER PUBLICATIONS

Gryder et al., "The Kinetics of the Exchange Reaction between the Two Oxidation States of Cerium in Acid Solution", Journal of American Chemical Society (J. Am. Chem. Soc.), vol. 73 pp. 2890–2895 (1951). The month in the date of the publication is not available.

Hofmann, "Chemiche Berichte", (Chem. Ber.), vol. 18, pp. 2755, (1885). The month in the date of the publication is not available.

*Primary Examiner*—P. Hampton-Hightower
*Attorney, Agent, or Firm*—Oliff & Berridge, PLC

[57] ABSTRACT

A novel amino resin composition produced by reacting one of or a mixture of more than two triazine derivatives of Formula I:

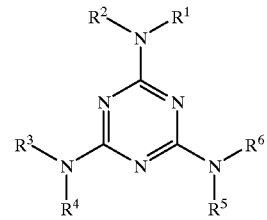

wherein, $R^1$, $R^2$, $R^3$, $R^4$, $R^5$ and $R^6$ each represent an independent substituent, and one to five substituents thereof represent a $C_{1-20}$ alkyl group, a $C_{2-20}$ alkenyl group (the alkyl group or alkenyl group may optionally have an alicyclic structure of phenyl group), or a phenyl group, and the remaining substituent or substituents represent a hydrogen atom with formaldehyde; a novel amino composition produced by reacting a mixture of one of or a mixture of more than two of said triazine derivatives and melamine or urea with formaldehyde; and an amino composition comprising a novel amino composition produced by reacting a mixture of one of or a mixture of more than two triazine derivatives with formaldehyde and a melamine-formaldehyde resin and a melamine/urea-formaldehyde resin or a urea-formaldehyde resin. The amino resin compositions have toughness, post-formability, heat resistance, high hardness and excellent gloss so that they are usable for laminated sheets, decorative sheets, molding compounds, and so on. Further, the compositions can be improved in solubility in organic solvents and liphophilicity by selecting substituents, and therefore are also usable in the fields of coatings and adhesives.

7 Claims, 1 Drawing Sheet

AMINO RESIN COMPOSITION

TECHNICAL FIELD

The present invention relates to an amino resin composition which is excellent in toughness, heat resistance, light resistance, and staining resistance, etc. The composition of the present invention is useful as a molding compound, a facing material, a curing agent for coatings, and an adhesive for woody materials, etc.

BACKGROUND ART

A malamine resin has been conventionally and widely employed as a molding compound, a facing material, a curing agent for coatings, and an adhesive for woody materials, etc. because of excellent heat resistance, high hardness, high gloss, quick curability, and an excellent mold release property in molding.

On the other hand, melamine is hexa-functional, and a triazine skelton is rigid. Accordingly, a crosslinking density in a cured product therefrom becomes exceedingly high in a case of preparing a resin with formaldehyde, whereby it is very hard and excellent in heat resistance. Contrarily, however, it is brittle, and there has been limitation in a case that the molding compound is employed as industrial parts.

For that reason, in a case that it is employed as molding compound, it has been attempted that the melamine resin has been modified by a rubber or phenol. However, a sufficient effect has not been obtained in the existing circumstances. Further, although the addition of various kinds of alcohols and saccharides into a melamine resin composition has been attempted for improving crack resistance and mechanical strength. However, in a case that co-condensation has not been sufficient in the preparation, there has been drawbacks to cause a decline of mechanical strength, a decline of crack resistance, and a decline of glossiness in surface because additives cause bleedout with a lapse of time.

Still further, the melamine resin in mainly employed in a baking coating as a curing agent for an alkyd resin, and it is excellent in heat resistance, light resitance, and resistance to scratching. On the other hand, it is poor in bending ability of a coating layer and post processability. For that reason, guanamines such as benzoguanamine and acetoguanamine are occasionally employed. However, benzoguanamine resin has benzene group in the structure and accordingly, it has been known that it in poor in light resistance and thus, it is limited in utilization. Also, a melamine-formaldehyde resin is poor in solubility in organic solvents and, for that reason, in the case that it is employed as an organic solvent-based coating, a melamine-formaldehyde reaction product has been dissolved into solvents by further alkoxylation with alcohols such as methanol, ethanol, propanol, isopropanol, and butanol. However, alkoxylation reaction has drawbacks that it requires a long time in reaction steps and that as the alkoxylation reaction in conducted in acidic condition, condensation is accelerated and thus, it becomes difficult in controlling a molecular weight.

The melamine resin has been conventionally and mainly employed as a facing material for a horizontal decorated surface in a furniture due to a high hardness, a high heat resistance, and high gloss. In recent years, so-called post-forming processing is frequently put into practice, in which a decorative laminated sheet is post-processed after curing in order to promote features as a design.

Whereas a decorative melamine laminated sheet has a high hardness, cracks are occasionally caused with a lapse of time. Therefore, the improvements in that point have been tried.

For the purpose, it has been conducted an improvement for modifying a melamine resin using various kinds of compounds having copolycondensation, or adding various kinds of additives to the melamine resin so as to improve the post-forming processing property and for crack resistance. however, when an incorporation of the compounds or additives into the resin is poor, water resistance and gloss are lowered. Thus, it can not be necessarily said that sufficient results have been obtained.

Melamine has been frequently employed as adhesives for woody materials in combination with urea. Although it is excellent in processability due to a quick curing rate compared to a phenolic resin adhesive employed in the same kinds of uses, it is disadvantageous to be used to resinous needle-leaf trees which have been often employed in recent years since a melamine resin adhesive itself is poor in a lipophilic nature.

The prevent invention provides an amino resin composition having toughness, bending processability, and a lipophilic nature without a loss of properties such as heat resistance, high hardness, and excellent gloss in the melamine resin.

DISCLOSURE OF THE INVENTION

The present invention relates to an amino resin composition which is produced by reacting one of triazine derivatives of formula [I] or a mixture of more than two triazine derivatives of said formula:

wherein substituents $R^1$, $R^2$, $R^3$, $R^4$, $R^5$ and $R^6$ each represent an independent substituent and one to five substituents thereof represent a $C_{1-20}$ alkyl group, an $C_{2-20}$ alkenyl group (the alkyl group or alkenyl group may optionally have an alicyclic structure or phenol group, and in a case that two of the alkyl groups or of the alkenyl groups are attached to the same nitrogen atom, they may form, together with the nitrogen atom, a 3- to 8-membered heterocyclic ring having 2- to 7-membered carbon chains), or a phenyl group, and the remaining substituent or substituents represent a hydrogen atom with formaldehyde.

Further, the present invention relates to an amino resin composition produced by reacting one of the trizaine derivatives of the formula [1] and melamine or urea with formaldehyde or a mixture of more than two triazine derivatives of said formula and melamine or urea with formaldehyde.

Still further, the present invention relates to amino resin composition containing the amino resin compositions which is produced by reacting one of triazine derivatives of the formula [I] or a mixture of more than two triazine derivatives of said formula with formaldehyde and a melamine-formaldehyde resin, a melamine/urea-formaldehyde resin or a urea-formaldehyde resin.

The substituted triazine derivative to be employed for preparing the amino resin composition of the present invention can be readily obtained by the same method as in the following publicly known synthesizing methods, for example, a method described in Journal of American Chemical Society (J. Am. Chem. Soc.). vol. 73, page 2984. 1951 in which 2-chloro-1,3,5-triazine derivative is allowed to react with an alkyl amine; a method described in Chemiche Berichte (Chem. Ber.), vol. 18, page 2755, 1885 in which 2,4,6-trimethylthio-1,3,5-triazine derivative is allowed to react with an alkyl amine; a method described in U.S. Pat. No. 2,228,161 (1941), in which 2,4,6-triamino-1,3,5-triazine derivative is allowed to react with alkyl amine hydrochloride; a method described in German Patent 889,593 (1953) in which 2-piperidino-4,6-diamino-1,3,5-triazine is obtained by allowing to react cyanopiperidine with cyanoguanidine; and a method described in Japanese Patent Application Laid-open No. Hei 3-215554 in which cyanuric chloride is allowed to react with corresponding alkyl amines.

As other methods, the following methods are exemplified which are filed as a patent application by the applicant of the present invention:

(a) a method described in Japanese Patent Application Laid-open No. Hei 8-27128 in which 1,3,5-triazine derivative is allowed to react with an alcohol in the presence of a catalyst of group VII or group VIII in periodic table, (b) a method described in Japanese Patent Application Laid-open No. Hei 8-193071 in which 1,3,5-triazine derivative is allowed to react with an aldehyde in the presence of a catalyst of group VII or group VIII in periodic table and a hydrogen-containing gas; and (c) a method described in Japanese Patent Application Laid-open No. Hei 8-27125 in which 1,3,5-triazine derivative is allowed to react with an olefine in the presence of a catalysts of group VII or group VIII in periodic table and a mixed gas of carbon monoxide/ hydrogen The triazine derivative to be employed for producing the amino resin composition of the present invention may be any of the triazine derivatives prepared by any of the above-mentioned methods. However, in a case that it is used in a field of electronic materials, it in preferable to obtain triazine derivative in which a hydrolyzable chlorine remains in the substituted triazine is minor or absent. Accordingly, it is preferable to use a triazine derivative obtained by a method in which melamine is allowed to react with alcohols in the presence of a specified catalyst as in the above-described literature (a), a method in which melamine is allowed to react with aldehydes in an atmosphere of hydrogen in the presence of a specified catalyst as in the above-described literature (b), or a method in which melamine is allowed to react with olefins in the presence of a specified catalyst in an atmosphere of hydrogen/carbon monoxide as in the above-described literature (c).

The concrete examples of the substituents $R^1$, $R^2$, $R^3$, $R^4$, $R^5$ and $R^6$ represented by a $C_{1-20}$ alkyl group, a $C_{2-20}$ alkenyl group (the alkyl group or alkenyl group may optionally have an alicyclic structure or phenyl group, and in a case that two of the alkyl grousp or alkenyl groups are attached to the same nitrogen atom, they may form, together with the nitrogen atom, a 3- to 8-membered heterocyclic ring having 2- to 7-membered carbon chains) or phenyl group are methyl group, ethyl group, n-propyl group, iso-propyl group, n-butyl group, iso-butyl group, sec-butyl group, tert-butyl group, cyclopropylmethyl group, cyclobutyl group, n-pentyl group, iso-pentyl group, sec-pentyl group, tert-pentyl group, cyclopentyl group, n-hexyl group, cyclohexyl group, cyclohexylmethyl group, 4-methylcyclohexyl methyl group, n-octyl group, 2-ethylhexyl group, n-nonyl group, n-decyl group, n-dodecyl group, n-hexadecyl group, n-octadecyl group, benzyl group, 1-phenetyl group, 2-phenetyl group, 1-phenylpropyl group, 3-phenylpropyl group, vinyl group, allyl group, methallyl group, crotyl group, 2-pentenyl group, 3-hexenyl group, styryl group and phenyl group.

As a cyclic structure in a case that two substituents at the same nitrogen atom form, together with the nitrogen atom, a heterocyclic ring, aziridine ring, azetidine ring, pyrrolidine ring, piperidine ring, etc. are exemplified. The scope of the triazine derivative employed for preparing the amino resin compositions of the present invention in not limited by the exemplification of the substituents.

In the present invention, it is possible to use one of triazine derivatives of the formula [I] or more than two triazine derivatives in combination in the reaction with formaldehyde, or use a mixture of one of the triazine derivatives or the more than two triazine derivatives in combination and melamine or urea with formaldehyde.

The triazine derivative to be employed in the present invention is more specifically illustrated by the combination of the substituents in Table 1 described below.

It is to be noted that abbreviation of the substituents groups in the Table shows the following meanings.

| | |
|---|---|
| Me: methyl group | Et: ethyl group |
| Pr: normal propyl group | ME: iso-propyl group |
| Bu: normal butyl group | IB: iso-butyl group |
| MP: secondary butyl group | TB: tertiary butyl group |
| PE: normal pentyl group | HE: normal hexyl group |
| EH: 2-ethylhexyl group | Oc: normal octyl group |
| De: normal decyl group | DD: normal dodecyl group |
| HD: normal hexadecyl group | OD: normal octadecyl group |
| AL: allyl group | ST: styryl group |
| Cy: cyclohexyl group | CM: cyclohexylmethyl group |
| Ph: phenyl group | Bz: benzyl group |

[I]

TABLE 1

| $R^1$ | $R^2$ | $R^3$ | $R^4$ | $R^5$ | $R^6$ |
|---|---|---|---|---|---|
| Me | H | H | H | H | H |
| Me | Me | H | H | H | H |
| Me | H | Me | H | H | H |
| Me | Me | Me | H | H | H |
| Me | H | Me | H | Me | H |
| Me | Me | Me | Me | H | H |
| Me | Me | Me | H | Me | H |
| Me | Me | Me | Me | Me | H |
| Et | Me | H | H | H | H |
| Et | Et | H | H | H | H |
| Et | H | Et | H | H | H |
| Et | Et | Et | H | H | H |
| Et | H | Et | H | Et | H |
| Et | Et | Et | Et | H | H |
| Et | Et | Et | H | Et | H |
| Et | Et | Et | Et | Et | H |
| Pr | H | H | H | H | H |
| Pr | Pr | H | H | H | H |
| Pr | H | Pr | H | H | H |

TABLE 1-continued

| R¹ | R² | R³ | R⁴ | R⁵ | R⁶ |
|----|----|----|----|----|----|
| Pr | Pr | Pr | H  | H  | H  |
| Pr | H  | Pr | H  | Pr | H  |
| Pr | Pr | Pr | H  | Pr | H  |
| Pr | Pr | Pr | Pr | Pr | H  |
| ME | H  | H  | H  | H  | H  |
| ME | ME | H  | H  | H  | H  |
| ME | H  | ME | H  | H  | H  |
| ME | ME | ME | H  | H  | H  |
| ME | H  | ME | H  | ME | H  |
| ME | ME | ME | ME | H  | H  |
| ME | ME | ME | H  | ME | H  |
| ME | ME | ME | ME | ME | H  |
| Bu | H  | H  | H  | H  | H  |
| Bu | Bu | H  | H  | H  | H  |
| Bu | H  | Bu | H  | H  | H  |
| Bu | Bu | Bu | H  | H  | H  |
| Bu | H  | Bu | H  | Bu | H  |
| Bu | Bu | Bu | Bu | H  | H  |
| Bu | Bu | Bu | H  | Bu | H  |
| Bu | Bu | Bu | Bu | Bu | H  |
| IB | H  | H  | H  | H  | H  |
| IB | IB | H  | H  | H  | H  |
| IB | H  | IB | H  | H  | H  |
| IB | IB | IB | H  | H  | H  |
| IB | H  | IB | H  | IB | H  |
| IB | IB | IB | IB | H  | H  |
| IB | IB | IB | H  | IB | H  |
| IB | IB | IB | IB | IB | H  |
| MP | H  | H  | H  | H  | H  |
| MP | MP | H  | H  | H  | H  |
| MP | H  | MP | H  | H  | H  |
| MP | MP | MP | H  | H  | H  |
| MP | H  | MP | H  | MP | H  |
| MP | MP | MP | MP | H  | H  |
| MP | MP | MP | H  | MP | H  |
| MP | MP | MP | MP | MP | H  |
| TB | H  | H  | H  | H  | H  |
| TB | TB | H  | H  | H  | H  |
| TB | H  | TB | H  | H  | H  |
| TB | TB | TB | H  | H  | H  |
| TB | H  | TB | H  | TB | H  |
| TB | TB | TB | TB | H  | H  |
| TB | TB | TB | H  | TB | H  |
| TB | TB | TB | TB | TB | H  |
| PE | H  | H  | H  | H  | H  |
| PE | PE | H  | H  | H  | H  |
| PE | H  | PE | H  | H  | H  |
| PE | PE | PE | H  | H  | H  |
| PE | H  | PE | H  | PE | H  |
| PE | PE | PE | PE | H  | H  |
| PE | PE | PE | H  | PE | H  |
| PE | PE | PE | PE | PE | H  |
| HE | H  | H  | H  | H  | H  |
| HE | HE | H  | H  | H  | H  |
| HE | H  | HE | H  | H  | H  |
| HE | HE | HE | H  | H  | H  |
| HE | H  | HE | H  | HE | H  |
| HE | HE | HE | HE | H  | H  |
| HE | HE | HE | H  | HE | H  |
| HE | HE | HE | HE | HE | H  |
| EH | H  | H  | H  | H  | H  |
| EH | EH | H  | H  | H  | H  |
| EH | H  | EH | H  | H  | H  |
| EH | EH | EH | H  | H  | H  |
| EH | H  | EH | H  | EH | H  |
| EH | EH | EH | EH | H  | H  |
| EH | EH | EH | H  | EH | H  |
| EH | EH | EH | EH | EH | H  |
| Oc | H  | H  | H  | H  | H  |
| Oc | Oc | H  | H  | H  | H  |
| Oc | H  | Oc | H  | H  | H  |
| Oc | Oc | Oc | H  | H  | H  |
| Oc | H  | Oc | H  | Oc | H  |
| Oc | Oc | Oc | Oc | H  | H  |
| Oc | Oc | Oc | H  | Oc | H  |
| Oc | Oc | Oc | Oc | Oc | H  |
| De | H  | H  | H  | H  | H  |
| De | De | H  | H  | H  | H  |
| De | H  | De | H  | H  | H  |
| De | De | De | H  | H  | H  |
| De | H  | De | H  | De | H  |
| De | De | De | De | H  | H  |
| De | De | De | H  | De | H  |
| De | De | De | De | De | H  |
| DD | H  | H  | H  | H  | H  |
| DD | DD | H  | H  | H  | H  |
| DD | H  | DD | H  | H  | H  |
| DD | DD | DD | H  | H  | H  |
| DD | H  | DD | H  | DD | H  |
| DD | DD | DD | DD | H  | H  |
| DD | DD | DD | H  | DD | H  |
| DD | DD | DD | DD | DD | H  |
| HD | H  | H  | H  | H  | H  |
| HD | HD | H  | H  | H  | H  |
| HD | H  | HD | H  | H  | H  |
| HD | HD | HD | H  | H  | H  |
| HD | H  | HD | H  | HD | H  |
| HD | HD | HD | HD | H  | H  |
| HD | HD | HD | H  | HD | H  |
| HD | HD | HD | HD | HD | H  |
| OD | H  | H  | H  | H  | H  |
| OD | OD | H  | H  | H  | H  |
| OD | H  | OD | H  | H  | H  |
| OD | OD | OD | H  | H  | H  |
| OD | H  | OD | H  | OD | H  |
| OD | OD | OD | OD | H  | H  |
| OD | OD | OD | H  | OD | H  |
| OD | OD | OD | OD | OD | H  |
| AL | H  | H  | H  | H  | H  |
| AL | AL | H  | H  | H  | H  |
| AL | H  | AL | H  | H  | H  |
| AL | AL | AL | H  | H  | H  |
| AL | H  | AL | H  | AL | H  |
| AL | AL | AL | AL | H  | H  |
| AL | AL | AL | H  | AL | H  |
| AL | AL | AL | AL | AL | H  |
| ST | H  | H  | H  | H  | H  |
| ST | ST | H  | H  | H  | H  |
| ST | H  | ST | H  | H  | H  |
| ST | ST | ST | H  | H  | H  |
| ST | H  | ST | H  | ST | H  |
| ST | ST | ST | ST | H  | H  |
| ST | ST | ST | H  | ST | H  |
| ST | ST | ST | ST | ST | H  |
| Cy | H  | H  | H  | H  | H  |
| Cy | H  | Cy | H  | H  | H  |
| Cy | H  | Cy | H  | Cy | H  |
| CM | H  | H  | H  | H  | H  |
| CM | H  | CM | H  | H  | H  |
| CM | H  | CM | H  | CM | H  |
| Ph | H  | H  | H  | H  | H  |
| Ph | H  | Ph | H  | H  | H  |
| Ph | H  | Ph | H  | Ph | H  |
| Bz | H  | H  | H  | H  | H  |
| Bz | H  | Bz | H  | H  | H  |
| Bz | H  | Bz | H  | Bz | H  |
| DD | Me | H  | H  | H  | H  |
| DD | H  | Me | H  | H  | H  |
| DD | Me | Me | H  | H  | H  |
| DD | H  | Me | H  | Me | H  |
| DD | Me | Me | Me | H  | H  |
| DD | Me | Me | H  | Me | H  |
| DD | Me | Me | Me | Me | H  |
| DD | Et | H  | H  | H  | H  |
| DD | H  | Et | H  | H  | H  |
| DD | Et | Et | H  | H  | H  |
| DD | H  | Et | H  | Et | H  |
| DD | Et | Et | Et | H  | H  |
| DD | Et | Et | H  | Et | H  |
| DD | Et | Et | Et | Et | H  |
| DD | Pr | H  | H  | H  | H  |
| DD | H  | Pr | H  | H  | H  |
| DD | Pr | Pr | H  | H  | H  |
| DD | H  | Pr | H  | Pr | H  |

TABLE 1-continued

| R¹ | R² | R³ | R⁴ | R⁵ | R⁶ |
|----|----|----|----|----|----|
| DD | Pr | Pr | H  | Pr | H  |
| DD | Pr | Pr | Pr | Pr | H  |
| DD | ME | H  | H  | H  | H  |
| DD | H  | ME | H  | H  | H  |
| DD | ME | ME | H  | H  | H  |
| DD | H  | ME | H  | ME | H  |
| DD | ME | ME | ME | H  | H  |
| DD | ME | ME | H  | ME | H  |
| DD | ME | ME | ME | ME | H  |
| DD | Bu | H  | H  | H  | H  |
| DD | H  | Bu | H  | H  | H  |
| DD | Bu | Bu | H  | H  | H  |
| DD | H  | Bu | H  | Bu | H  |
| DD | Bu | Bu | Bu | H  | H  |
| DD | Bu | Bu | H  | Bu | H  |
| DD | Bu | Bu | Bu | Bu | H  |
| DD | IB | H  | H  | H  | H  |
| DD | H  | IB | H  | H  | H  |
| DD | IB | IB | H  | H  | H  |
| DD | H  | IB | H  | IB | H  |
| DD | IB | IB | IB | H  | H  |
| DD | IB | IB | H  | IB | H  |
| DD | IB | IB | IB | IB | H  |
| DD | MP | H  | H  | H  | H  |
| DD | H  | MP | H  | H  | H  |
| DD | MP | MP | H  | H  | H  |
| DD | H  | MP | H  | MP | H  |
| DD | MP | MP | MP | H  | H  |
| DD | MP | MP | H  | MP | H  |
| DD | MP | MP | MP | MP | H  |
| DD | TB | H  | H  | H  | H  |
| DD | H  | TB | H  | H  | H  |
| DD | TB | TB | H  | H  | H  |
| DD | H  | TB | H  | TB | H  |
| DD | TB | TB | TB | H  | H  |
| DD | TB | TB | H  | TB | H  |
| DD | TB | TB | TB | TB | H  |
| DD | PE | H  | H  | H  | H  |
| DD | H  | PE | H  | H  | H  |
| DD | PE | PE | H  | H  | H  |
| DD | H  | PE | H  | PE | H  |
| DD | PE | PE | PE | H  | H  |
| DD | PE | PE | H  | PE | H  |
| DD | PE | PE | PE | PE | H  |
| DD | HE | H  | H  | H  | H  |
| DD | H  | HE | H  | H  | H  |
| DD | HE | HE | H  | H  | H  |
| DD | H  | HE | H  | HE | H  |
| DD | HE | HE | HE | H  | H  |
| DD | HE | HE | H  | HE | H  |
| DD | HE | HE | HE | HE | H  |
| DD | EH | H  | H  | H  | H  |
| DD | H  | EH | H  | H  | H  |
| DD | EH | EH | H  | H  | H  |
| DD | H  | EH | H  | EH | H  |
| DD | EH | EH | EH | H  | H  |
| DD | EH | EH | H  | EH | H  |
| DD | EH | EH | EH | EH | H  |
| DD | Oc | H  | H  | H  | H  |
| DD | H  | Oc | H  | H  | H  |
| PD | Oc | Oc | H  | H  | H  |
| DD | H  | Oc | H  | Oc | H  |
| DD | Oc | Oc | Oc | H  | H  |
| DD | Oc | Oc | H  | Oc | H  |
| DD | Oc | Oc | Oc | Oc | H  |
| DD | De | H  | H  | H  | H  |
| DD | H  | De | H  | H  | H  |
| DD | De | De | H  | H  | H  |
| DD | H  | De | H  | De | H  |
| DD | De | De | De | H  | H  |
| DD | De | De | H  | De | H  |
| DD | De | De | De | De | H  |
| DD | HD | H  | H  | H  | H  |
| DD | H  | HD | H  | H  | H  |
| DD | HD | HD | H  | H  | H  |
| DD | H  | HD | H  | HD | H  |
| DD | HD | HD | HD | H  | H  |
| DD | HD | HD | H  | HD | H  |
| DD | HD | HD | HD | HD | H  |
| DD | OD | H  | H  | H  | H  |
| DD | H  | OD | H  | H  | H  |
| DD | OD | OD | H  | H  | H  |
| DD | H  | OD | H  | OD | H  |
| DD | OD | OD | OD | H  | H  |
| DD | OD | OD | H  | OD | H  |
| DD | OD | OD | OD | OD | H  |
| DD | AL | H  | H  | H  | H  |
| DD | H  | AL | H  | H  | H  |
| DD | AL | AL | H  | H  | H  |
| DD | H  | AL | H  | AL | H  |
| DD | AL | AL | AL | H  | H  |
| DD | AL | AL | H  | AL | H  |
| DD | AL | AL | AL | AL | H  |
| DD | ST | H  | H  | H  | H  |
| DD | H  | ST | H  | H  | H  |
| DD | ST | ST | H  | H  | H  |
| DD | H  | ST | H  | ST | H  |
| DD | ST | ST | ST | H  | H  |
| DD | ST | ST | H  | ST | H  |
| DD | ST | ST | ST | ST | H  |
| DD | H  | Cy | H  | H  | H  |
| DD | H  | Cy | H  | Cy | H  |
| DD | H  | CM | H  | H  | H  |
| DD | H  | CM | H  | CM | H  |
| DD | H  | Ph | H  | H  | H  |
| DD | H  | Ph | H  | Ph | H  |
| DD | H  | Bz | H  | H  | H  |
| DD | H  | Bz | H  | Bz | H  |
| HD | Me | H  | H  | H  | H  |
| HD | H  | Me | H  | H  | H  |
| HD | Me | Me | H  | H  | H  |
| HD | H  | Me | H  | Me | H  |
| HD | Me | Me | Me | H  | H  |
| HD | Me | Me | H  | Me | H  |
| HD | Me | Me | Me | Me | H  |
| HD | Et | H  | H  | H  | H  |
| HD | H  | Et | H  | H  | H  |
| HD | Et | Et | H  | H  | H  |
| HD | H  | Rt | H  | Et | H  |
| HD | Et | Et | Et | H  | H  |
| HD | Et | Et | H  | Et | H  |
| HD | Et | Et | Et | Et | H  |
| HD | Pr | H  | H  | H  | H  |
| HD | H  | Pr | H  | H  | H  |
| HD | Pr | Pr | H  | H  | H  |
| HD | H  | Pr | H  | Pr | H  |
| HD | Pr | Pr | Pr | H  | H  |
| HD | Pr | Pr | H  | Pr | H  |
| HD | Pr | Pr | Pr | Pr | H  |
| HD | ME | H  | H  | H  | H  |
| HD | H  | ME | H  | H  | H  |
| HD | ME | ME | H  | H  | H  |
| HD | H  | ME | H  | ME | H  |
| HD | ME | ME | ME | H  | H  |
| HD | ME | ME | H  | ME | H  |
| HD | ME | ME | ME | ME | H  |
| HD | Bu | H  | H  | H  | H  |
| HD | H  | Bu | H  | H  | H  |
| HD | Bu | Bu | H  | H  | H  |
| HD | H  | Bu | H  | Bu | H  |
| HD | Bu | Bu | Bu | H  | H  |
| HD | Bu | Bu | H  | Bu | H  |
| HD | Bu | Bu | Bu | Bu | H  |
| HD | IB | H  | H  | H  | H  |
| HD | H  | IB | H  | H  | H  |
| HD | IB | IB | H  | H  | H  |
| HD | H  | IB | H  | IB | M  |
| HD | IB | IB | IB | H  | H  |
| HD | IB | IB | H  | IB | H  |
| HD | IB | IB | IB | IB | H  |
| HD | MP | H  | H  | H  | H  |
| HD | H  | MP | H  | H  | H  |
| HD | MP | MP | H  | H  | H  |
| HD | H  | MP | H  | MP | H  |
| HD | MP | MP | MP | H  | H  |

TABLE 1-continued

| R¹ | R² | R³ | R⁴ | R⁵ | R⁶ |
|---|---|---|---|---|---|
| HD | MP | MP | H | MP | H |
| HD | MP | MP | MP | MP | H |
| HD | TB | H | H | H | H |
| HD | H | TB | H | H | H |
| HD | TB | TB | H | H | H |
| HD | H | TB | H | TB | H |
| HD | TB | TB | TB | H | H |
| HD | TB | TB | H | TB | W |
| HD | TB | TB | TB | TB | H |
| HD | PE | H | H | H | H |
| HD | H | PE | H | H | H |
| HD | PE | PE | H | H | H |
| HD | H | PE | H | PE | H |
| HD | PE | PE | PE | H | H |
| HD | PE | PE | H | PE | H |
| HD | PE | PE | PE | PE | H |
| Hb | HE | H | H | H | H |
| HD | H | HE | H | H | H |
| HD | HE | HE | H | H | H |
| HD | H | HE | H | HE | H |
| HD | HE | HE | HE | H | H |
| HD | HE | HE | H | HE | H |
| HD | HE | HE | HE | HE | H |
| HD | EH | H | H | H | H |
| HD | H | EH | H | H | H |
| HD | EH | EH | H | H | H |
| HD | H | EH | H | EH | H |
| HD | EH | ER | EH | H | H |
| HD | EH | EH | H | EH | H |
| HD | EH | EH | EH | EH | H |
| HD | Oc | H | H | H | H |
| HD | H | Oc | H | H | H |
| HD | Oc | Oc | H | H | H |
| HD | H | Oc | H | Oc | H |
| HD | Oc | Oc | Oc | H | H |
| HD | Oc | Oc | H | Oc | H |
| HD | Oc | Oc | Oc | Oc | H |
| HD | De | H | H | H | H |
| HD | H | De | H | H | H |
| HD | De | De | H | H | H |
| HD | H | De | H | De | H |
| HD | De | De | De | H | H |
| HD | De | De | H | De | H |
| HD | De | De | De | De | H |
| HD | DD | H | H | H | H |
| HD | H | DD | H | H | H |
| HD | DD | DD | H | H | H |
| HD | H | DD | H | DD | H |
| HD | DD | DD | DD | H | H |
| RD | DD | DD | H | DD | H |
| HD | DD | DD | DD | DD | H |
| HD | OD | H | H | H | H |
| HD | H | OD | H | H | H |
| HD | OD | OD | H | H | H |
| HD | H | OD | H | OD | H |
| HD | OD | OD | OD | H | H |
| HD | OD | OD | H | OD | H |
| HD | OD | OD | OD | OD | H |
| HD | AL | H | H | H | H |
| HD | H | AL | H | H | H |
| HD | AL | AL | H | H | H |
| HD | H | AL | H | AL | H |
| HD | AL | AL | AL | H | H |
| HD | AL | AL | H | AL | H |
| HD | AL | AL | AL | AL | H |
| HD | ST | H | H | H | H |
| HD | H | ST | H | H | M |
| HD | ST | ST | H | H | H |
| HD | H | ST | H | ST | H |
| HD | ST | ST | ST | H | H |
| HD | ST | ST | H | ST | H |
| HD | ST | ST | ST | ST | H |
| HD | H | Cy | H | H | H |
| HD | H | Cy | H | Cy | H |
| HD | H | CM | H | H | H |
| HD | H | CM | H | CM | H |
| HD | H | Ph | H | H | H |
| HD | H | Ph | H | Ph | H |
| HD | H | Bz | H | H | H |
| HD | H | Bz | H | Bz | H |
| OD | Me | H | H | H | H |
| OD | H | Me | H | H | H |
| OD | Me | Me | H | H | H |
| OD | H | Me | H | Me | H |
| OD | Me | Me | Me | H | H |
| OD | Me | Me | H | Me | H |
| OD | Me | Me | Me | Me | H |
| OD | Et | H | H | H | H |
| OD | H | Et | H | H | H |
| OD | Et | Et | H | H | H |
| OD | H | Et | H | Et | H |
| OD | Et | Et | Et | H | H |
| OD | Et | Et | H | Et | H |
| OD | Et | Et | Et | Et | H |
| OD | Pr | H | H | H | H |
| OD | H | Pr | H | H | H |
| OD | Pr | Pr | H | H | H |
| OD | H | Pr | H | Pr | H |
| OD | Pr | Pr | H | Pr | H |
| OD | Pr | Pr | Pr | Pr | H |
| OD | ME | H | H | H | H |
| OD | H | ME | H | H | H |
| OD | ME | ME | H | H | H |
| OD | H | ME | H | ME | H |
| OD | ME | ME | ME | H | H |
| OD | ME | ME | H | ME | H |
| OD | ME | ME | ME | ME | H |
| OD | Bu | H | H | H | H |
| OD | H | Bu | H | H | H |
| OD | Bu | Bu | H | H | H |
| OD | H | Bu | H | Bu | H |
| OD | Bu | Bu | Bu | H | H |
| OD | Bu | Bu | H | Bu | H |
| OD | Bu | Bu | Bu | Bu | H |
| OD | IB | H | H | H | H |
| OD | H | IB | H | H | H |
| OD | IB | IB | H | H | H |
| OD | H | IB | H | IB | H |
| OD | IB | IB | IB | H | H |
| OD | IB | IB | H | IB | H |
| OD | IB | IB | IB | IB | H |
| OD | MP | H | H | H | H |
| OD | H | MP | H | H | H |
| OD | MP | MP | H | H | H |
| OD | H | MP | H | MP | H |
| OD | MP | MP | MP | H | H |
| OD | MP | MP | H | MP | H |
| OD | MP | MP | MP | MP | H |
| OD | TB | H | H | H | H |
| OD | H | TB | H | H | H |
| OD | TB | TB | H | H | H |
| OD | H | TB | H | TB | H |
| OD | TB | TB | TB | H | H |
| OD | TB | TB | H | TB | H |
| OD | TB | TB | TB | TB | H |
| PE | PE | H | H | H | H |
| OD | H | PE | H | H | H |
| OD | PE | PE | H | H | H |
| OD | H | PE | H | PE | H |
| OD | PE | PE | PE | H | H |
| OD | PE | PE | H | PE | H |
| OD | PE | PE | PE | PE | H |
| OD | HE | H | H | H | H |
| OD | H | HE | H | H | H |
| OD | HE | HE | H | H | H |
| OD | H | HE | H | HE | H |
| OD | HE | HE | HE | H | H |
| OD | HE | HE | H | HE | H |
| OD | HE | HE | HE | HE | H |
| OD | EH | H | H | H | H |
| OD | H | EH | H | H | H |
| OD | EH | EH | H | H | H |
| OD | H | EH | H | EH | H |
| OD | EH | EH | EH | H | H |

TABLE 1-continued

| R¹ | R² | R³ | R⁴ | R⁵ | R⁶ |
|---|---|---|---|---|---|
| OD | EH | EH | H | EH | H |
| OD | EH | EH | EH | EH | H |
| OD | Oc | H | H | H | H |
| OD | H | Oc | H | H | H |
| OD | Oc | Oc | H | H | H |
| OD | H | Oc | H | Oc | H |
| OD | Oc | Oc | Oc | H | H |
| OD | Oc | Oc | H | Oc | H |
| OD | Oc | Oc | Oc | Oc | H |
| OD | De | H | H | H | H |
| OD | H | De | H | H | H |
| OD | De | De | H | H | H |
| OD | H | De | H | De | H |
| OD | De | De | De | H | H |
| OD | De | De | H | De | H |
| OD | De | De | De | De | H |
| OD | DD | H | H | H | H |
| OD | H | DD | H | H | H |
| OD | DD | DD | H | H | H |
| OD | H | DD | H | DD | H |
| OD | DD | DD | DD | H | H |
| OD | DD | DD | H | DD | H |
| OD | DD | DD | DD | DD | H |
| OD | HD | H | H | H | H |
| OD | H | HD | H | H | H |
| OD | HD | HD | H | H | H |
| OD | H | HD | H | HD | H |
| OD | HD | HD | HD | H | H |
| OD | HD | HD | H | HD | H |
| OD | HD | HD | HD | HD | H |
| OD | AL | H | H | H | H |
| OD | H | AL | H | H | H |
| OD | AL | AL | H | H | H |
| OD | H | AL | H | AL | H |
| OD | AL | AL | AL | H | H |
| OD | AL | AL | H | AL | H |
| OD | AL | AL | AL | AL | H |
| OD | ST | H | H | H | H |
| OD | H | ST | H | H | H |
| OD | ST | ST | H | H | H |
| OD | H | ST | H | ST | H |
| OD | ST | ST | ST | H | H |
| OD | ST | ST | H | ST | H |
| OD | ST | ST | ST | ST | H |
| OD | H | Cy | H | H | H |
| OD | H | Cy | H | Cy | H |
| OD | H | CM | H | H | H |
| OD | H | CM | H | CM | H |
| OD | H | Ph | H | H | H |
| OD | H | Ph | H | Ph | H |
| OD | H | Bz | H | H | H |
| OD | H | Bz | H | Bz | H |
| Mo | H | EH | H | H | H |
| Me | Me | EH | H | H | H |
| Me | H | EH | H | Me | H |
| Me | Me | EH | H | Me | H |
| Me | Me | Me | Me | EH | H |
| Me | H | Cy | H | H | H |
| Me | Me | Cy | H | H | H |
| Me | H | Cy | H | Me | H |
| Me | Me | Cy | H | Me | H |
| Me | Me | Me | Me | Cy | H |
| Me | H | Bz | H | H | H |
| Me | Me | Bz | H | H | H |
| Me | H | Bz | H | Me | H |
| Me | Me | Bz | H | Me | H |
| Me | Me | Me | Me | Bz | H |
| Et | H | EH | H | H | H |
| Et | Et | EH | H | H | H |
| Et | H | EH | H | Et | H |
| Et | Et | EH | H | Et | H |
| Et | Et | Et | Et | EH | H |
| Et | H | Cy | H | H | H |
| Et | Et | Cy | H | H | H |
| Et | H | Cy | H | Et | H |
| Et | Et | Cy | H | Et | H |
| Et | Et | Et | Et | Cy | H |
| Et | H | Bz | H | H | H |
| Et | Et | Bz | H | H | H |
| Et | H | Bz | H | Et | H |
| Et | Et | Bz | H | Et | H |
| Et | Et | Et | Et | Bz | H |
| ME | H | EH | H | H | H |
| ME | H | Cy | H | H | H |
| ME | H | Cy | H | ME | H |
| ME | H | Bz | H | H | H |
| ME | H | Bz | H | ME | H |
| Bu | H | EH | H | H | H |
| Bu | Bu | EH | H | H | H |
| Bu | H | EH | H | Bu | H |
| Bu | Bu | EH | H | Bu | H |
| Bu | Bu | Bu | Bu | EH | H |
| Bu | H | Cy | H | H | H |
| Bu | Bu | Cy | H | H | H |
| Bu | H | Cy | H | Bu | H |
| Bu | Bu | Cy | H | Bu | H |
| Bu | Bu | Bu | Bu | Cy | H |
| Bu | H | Bz | H | H | H |
| Bu | Bu | Bz | H | H | H |
| Bu | H | Bz | H | Bu | H |
| Bu | Bu | Bz | H | Bu | H |
| Bu | Bu | Bu | Bu | Bz | H |
| AL | H | EH | H | H | H |
| AL | H | EH | H | AL | H |
| AL | AL | EH | H | AL | H |
| AL | AL | AL | AL | EH | H |
| AL | H | Cy | H | H | H |
| AL | AL | Cy | H | H | H |
| AL | H | Cy | H | AL | H |
| AL | AL | Cy | H | AL | H |
| AL | H | Bz | H | H | H |
| AL | AL | Bz | H | H | H |
| AL | H | Bz | H | AL | H |
| AL | AL | Bz | H | AL | H |
| AL | AL | AL | AL | Bz | H |
| —(CH₂)₄— | | H | H | H | H |
| —(CH₂)₄— | | —(CH₂)₄— | | H | H |
| —(CH₂)₄— | | —(CH₂)₄— | | Bu | H |
| —(CH₂)₄— | | H | H | H | H |
| —(CH₂)₅— | | H | H | Me | H |
| —(CH₂)₆— | | H | H | Et | H |
| —(CH₂)₅— | | H | H | Pr | H |
| —(CH₂)₅— | | H | H | Bu | H |
| —(CH₂)₅— | | —(CH₂)₅— | | H | H |
| —(CH₂)₅— | | —(CH₂)₅— | | Bu | H |
| —(CH₂)₄— | | EH | H | H | H |
| —(CH₂)₄— | | EH | H | Bu | H |
| —(CH₂)₄— | | EH | H | MP | H |
| —(CH₂)₄— | | EH | H | PE | W |
| —(CH₂)₄— | | EH | H | HE | H |
| —(CH₂)₄— | | —(CH₂)₄— | | EH | H |
| —(CH₂)₄— | | Cy | H | H | H |
| —(CH₂)₄— | | Cy | H | IB | H |
| —(CH₂)₄— | | Cy | H | EH | H |
| —(CH₂)₄— | | Cy | H | Oc | H |
| —(CH₂)₄— | | Cy | H | OD | H |
| —(CH₂)₄— | | —(CH₂)₄— | | Cy | H |
| —(CH₂)₄— | | Bz | H | H | H |
| —(CH₂)₄— | | Bz | H | Me | H |
| —(CH₂)₄— | | Bz | H | Et | H |
| —(CH₂)₄— | | Bz | H | Pr | H |
| —(CH₂)₄— | | Bz | H | Bu | H |
| —(CH₂)₄— | | —(CH₂)₄— | | Bz | H |
| —(CH₂)₅— | | EH | H | Me | H |
| —(CH₂)₅— | | EH | H | Et | H |
| —(CH₂)₅— | | EH | H | Pr | H |
| —(CH₂)₅— | | EH | H | EH | H |
| —(CH₂)₅— | | —(CH₂)₅— | | EH | H |
| —(CH₂)₅— | | Cy | H | H | H |
| —(CH₂)₅— | | Cy | Bu | H | H |
| —(CH₂)₅— | | Cy | HE | H | H |
| —(CH₂)₅— | | Cy | H | De | H |

TABLE 1-continued

| R$^1$ | R$^2$ | R$^3$ | R$^4$ | R$^5$ | R$^6$ |
|---|---|---|---|---|---|
| | —(CH$_2$)$_5$— | Cy | H | HD | H |
| | —(CH$_2$)$_5$— | | —(CH$_2$)$_5$— | H | H |
| | —(CH$_2$)$_5$— | Bz | H | H | H |
| | —(CH$_2$)$_5$— | Bz | De | H | H |
| | —(CH$_2$)$_5$— | Bz | HD | H | H |
| | —(CH$_2$)$_5$— | Bz | H | De | H |
| | —(CH$_2$)$_5$— | Bz | H | HD | H |
| | —(CH$_2$)$_5$— | | —(CH$_2$)$_5$— | Bz | H |

In the combination of the substituents in the formula [I], preferable group is one in which one to three of R$^1$, R$^2$ and R$^6$ among the substituents R$^1$, R$^2$, R$^3$, R$^4$, R$^5$ and R$^6$ represent an alkyl group of C$_{1-20}$ and remaining substituents represent a hydrogen atom.

In the combination of the substituents in the formula [I], more preferable group is one in which one to three of R$^1$, R$^2$ and R$^6$ among the substituents R$^1$, R$^2$, R$^3$, R$^4$, R$^5$ and R$^6$ represent methyl group, ethyl group, n-propyl group, iso-propyl group, n-butyl group, cyclohexyl group or 2-ethylhexyl group and the remaining substituents represent a hydrogen atom.

In the reaction of one of the triamine derivative of at least two kinds of the triazine derivative represented by the formula [I] or a mixture of more than two triazine derivatives of said formula to be employed for producing the amino resin composition with formaldehyde, the mol number of formaldehyde based on 1 mol of one of the triazine derivatives or of a mixture of more than two triazine derivatives preferably ranges from 1 mol to the same mol number as in unsubstituted hydrogen atom of amino groups in the triazine derivative based on 1 mol of the triazine derivative. In a case that the mol number of formaldehyde is less than 1 mol, crosslinking structures are not sufficiently formed in a product formed by thermosetting the resin composition, resulting in that physical properties such as heat resistance, high hardness and toughness are not satisfied in a thermoset product from the amino resin composition. On the other hand, in a case that said mol number of formaldehyde is more than the same mol number as that of the unsubstituted hydrogen atom of amino groups in the triazine derivative, there remains formaldehyde which is not taken part in an addition-reaction with the triazine derivative. In that case, it is difficult to remove the remaining formalin and, for that reason, formalin odor becomes unpreferably remarkable in the amino resin composition. Formalin odor becomes remarkable also in a case of thermosetting. Also, the use of an excessive amount of formaldehyde becomes economically disadvantageous.

Although the reaction of the triazine derivative with formaldehyde in the present invention is usually conducted in an aqueous medium, since the triazine derivative in the present invention is usually soluble in organic solvents, the reaction with formaldehyde smoothly progresses by adding an organic solvent which is also soluble in water. As the organic solvents, alcohols such as methanol, ethanol, iso-propanol and propanol, ethers such as dioxane, tetrahydrofuran and 1,2-dimethoxyethane, dimethylformamide and dimethylsulfoxide which are polar solvents are preferable.

In a reaction of resinification which is the reaction of the triazine derivative with formaldehyde, the reaction temperature usually ranges in 50 to 95° C. However, even in a temperature lower than the range, the reaction occasionally progresses and, for example, in a case that an organic solvent is added, the reaction of resinification progresses at temperatures lower than 50° C.

In the reaction of resinification, pH of a reaction liquid is 6 to 10, and preferably 7 to 9. In order to increase a molecular weight of a product produced by the reaction of resinification, pH ranges in a neutral side, for example, 7 to 7.5, and in a case of controlling a molecular weight to be low, the reaction of resinification is allowed to progress at pH in an alkali side, for example, pH of 8 to 9.

Reaction time, that is, a time from initiation to termination of the reaction of resinification is decided by adjusting a reaction termination period at which there is obtained a resin composition having a desired molecular weight. Sampling is appropriately conducted during the reaction, and a molecular weight is decided by a cloud temperature method and a water-mixed cloud method and/or measurement of a molecular weight by a gel permeation chromatography method.

In the present invention, as described hereinabove, in the reaction of one of the triazine derivative of the formula [I] or a mixture of more than two triazine derivatives of said formula with formaldehyde, it is also conducted the resinification by mixing melamine or urea with one of the triazine derivatives or a mixture of more than two triazine derivatives.

There is no limitation of the amount of melamine or urea which is mixed with one of the triazine derivatives or a mixture of more than two triazine derivatives. Generally, however, in a case that the amount of melamine or urea becomes large, although crosslinking density becomes high and hardness increases, a resin becomes brittle and toughness decreases. The amount by mol of melamine or urea to be mixed is 0.05 to 20 mol, preferably 0.1 to 10 mol based an 1 mol of the triazine derivative.

Reaction conditions in the reaction of formaldehyde with one of the triazine derivatives of the formula [I] or a mixture of more than two triazine derivatives of said formula mixed with melamine or urea, that is, solvents, reaction temperature, pH of a reaction liquid, reaction temperature, etc. are the same as in those of the above-described reaction of the triazine derivative with formaldehyde. Mol number of formaldehyde in the reaction preferably ranges from equal mol number to the total mol number of urea and the triazine derivative to the same mol number as in substituted nitrogen atoms of amino groups in melamine, urea, and the triazine derivative. In a case of less than equal mol number, crosslinking cannot be sufficiently formed, resulting in that physical properties become poor. On the other hand, in a case of more than the same mole number as in unsubstituted nitrogen atoms of amino groups in melamine, urea, and the triazine derivative, there remains formaldehyde which is not taken part in an addition-reaction or a condensation reaction with the triazine derivative and, since the removal of such formaldehydes in difficult, formalin odor remarkably remains in the composition, resulting in being unpreferred. Also, the use of an excessive amount of formaldehyde is economically disadvantageous.

Further, it is conducted to use a mixture of the amino resin composition which is prepared by reacting one of the triazine derivatives of the formula [I] or a mixture of more than two triazine derivatives of said formula with formaldehyde and a melamine-formaldehyde resin, a melamine/urea-formaldehyde resin or a urea-formaldehyde resin. The mixture means a mixture in which a liquid product or a solid product of the amino resin composition which is produced by reacting one of the triazine derivatives of the present invention or a mixture of more than two triazine derivatives thereof with formaldehyde is mixed with at least one of the melamine-formaldehyde resin, a melamine/urea-formaldehyde resin or a urea-formaldehyde resin which is selected from resins obtained by known methods in an optional mixing proportion.

As exemplification of the melamine-formaldehyde resin obtained by known methods, there is a liquid resin having a solid concentration of 55% and a molecular weight of 600 or so, which is obtained by a reaction of 1 mol of melamine with 1.6 mol of formaldehyde at pH of 8 and temperature of 95° C. for 60 minutes or so. Also, as exemplification of the melamine/urea-formaldehyde resin, there is a liquid resin having a solid concentration of 55% and a molecular weight of 700 or so, which is obtained by a reaction of 0.2 mol of melamine and 1 mol of urea with 1.8 mol of formaldehyde at pH of 7.9 and temperature of 90° C. for 120 minutes or so. And also, as exemplification of urea resin, there is a liquid resin having a solid concentration of 50% and a molecular weight of 500 or so, which is obtained by a reaction of 1 mol of urea with 1.8 mol of formaldehyde at pH of 8.0 and temperature of 90° C. for 150 minutes or so.

Mixing proportion of the triazine derivative-formaldehyde resin composition with the above-described melamine/formaldehyde resin, melamine/urea-formaldehyde resin, or urea-formaldehyde resin is within wide range. In a case that the proportion of the triazine derivative-formaldehyde resin composition is high, an effect for improvement becomes large in toughness, banding processability, and a lipophilic nature. On the other hand, in a case that the proportion is low, an effect for improvement becomes poor. Although mixing amount is different depending upon uses and purposes, the melamine/formaldehyde resin, melamine/urea-formaldehyde resin or urea-formaldehyde resin is employed in 20 to 1000 parts by weight, preferably 50 to 500 parts by weight based on 100 parts by weight of the triazine derivative-formaldehyde resin compositions The amino resin composition prepared as described herein above is employed in fields such as adhesives for woody materials, molding compound, facing materials and coatings.

In a case that it is employed as the adhesives for woody materials, the amino resin composition is mixed with wood-meal and the resulting amino resin composition is thermoset by hot press. If necessary, a thicking agent and an agent for controlling penetration, etc.

In a case that it is employed as the materials for molding compound, the amino resin composition in a liquid state or a dried powder-state is added with a curing agent, and then mixed woodmeal, pulp powder and inorganic powder, etc. together with hot press-molding to give a shape and the amino resin composition is thermoset.

In a case that it is employed as the facing materials, the amino resin composition is thermally cured with a thermal press through a process in which an amino resin liquid of amino resin composition added with a curing agent is impregnaged into papers, etc. and dried, and then combined with phenol resin-impregnated paper or a woody plate and are hot-pressed, whereby the amino resin composition being thermoset.

In a case that it is employed as the coatings, the amino resin composition is combined with an alkyd resin, a polyester resin and an acrylic resin, etc., and added with a curing agent and other additives to give a coating composition. The amino resin composition is used as a crosslinking agent which thermally reacts to OH groups in resins combined. In that case, it is prepared as a water-soluble type, an organic solvent-soluble type and a solid type resin according to conditions to be required for the coatings.

BRIEF DESCRIPTION OF DRAWINGS

(Description of marks)

$L_0$: Length before loading

L: Length in loading

BEST MODE FOR CARRYING OUT THE INVENTION

Hereinafter, although the present invention is described in more detail by Examples and Comparative Examples, descriptions in the Examples do not mean a limitation of a scope in the present invention.

Although triazine derivatives to be employed in Examples are prepared by methods in Reference Examples described below, those are not limited by the Examples.

REFERENCE EXAMPLE 1

Synthesis of 2,4-diamino-6-normal butylamino-1,3,5-triazine (a) Synthesis of 2,4-diamino-6-chloro-1,3,5-triazine 184.5 g (1.0 mol) of cyanuric chloride was dissolved in 800 mL of acetonitrile at room temperature, and 303.7 g (5.0 mol) of 28%-aqueous ammonia was added dropwise into the solution cooled to 0° C., over 2 hours while vigorously stirring and maintaining the reaction temperature at not more then 10° C. After the completion of dropwise addition, cooling was stopped, and stirring was continued for 1 hour at room temperature, followed by gradually heating to 45° C. and allowing to further react for 4 hours. After cooling, a product was filtered, followed by washing with a large quantity of water. The filtered product was dried at 50° C. in vacuo for 6 hours to obtain 115 g (a yield of 79%) of the above-identified compound.

(b) Synthesis of 2,4-diamino-6-normalbutylamino-1,3,5-triazine

A mixed solution of 14.5 g (0.1 mol) of 2,4-diamino-6-chloro-1,3,5-triazine prepared in the (a), 100 mL of water and 29.2 g (0.4 mol) of butylamine was heated while stirring, followed by being finally reacted for 6 hours at reflux temperature. After cooling reaction liquid, a product was filtered, followed by washing with a large quantity of water and then with toluene. The product was dried at 70° C. in vacuo for 6 hours to obtain 17.5 g (a yield of 96%) of the above-identified compound. Melting point: 167° C.

REFERENCE EXAMPLE 2

Synthesis of 2,4,6-tris(normalbutylamino)-1,3,5-triazine

An autoclave equipped with a stirrer and a thermometer was charged with 12.6 g (0.1 mol) of melamine, 200 g of 1,4-dioxane, 72.0 g (1.0 mol) of n-butylaldehyde, and 2.0 g of 5% Pd on activated carbon. After the inside of the system was purged with nitrogen gas, initial pressure of hydrogen gas was adjusted at 40 kg/cm$^2$, followed by being reacted at reaction temperature of 180° C. for 6 hours while vigorously stirring. After the completion of the reaction, the resulting mixture was slowly cooled to room temperature, and catalyst end solid were removed by filtration, followed by distilling the solvent off to obtain a viscous liquid-state reaction product. The obtained product was developed by silica-gel column chromatography using a mixed solvent of acetone/hexane as an eluent while successively changing the concentration in a mixing ratio of 100/1 to 1/100. After isolating a product, the solvent was distilled off to obtain 19.6 g of the above-identified compound which is in a liquid-state.

REFERENCE EXAMPLE 3

Synthesis of 4,6-diamino-2-cyclohexylamino-1,3,5-triazine

A mixed solution of 14.5 g (0.1 mol) of 2,4-diamino-6-chloro-1,3,5-triazine which is an intermediate product synthesized in the Reference Example 1, 140 mL of water, and 29.2 g (0.3 mol) of cyclohexylamine was heated while stirring, followed by being reated for 1 hour at reflux temperature. Subsequently, the reaction mixture was added with 40 mL of aqueous solution containing 12 g of sodium hydroxide over 1 hour, followed by aging for 1 hour. Into a reaction mixture obtained, 200 mL of toluene was added, followed by being cooled to room temperature. A crystalline obtained was filtered, followed by washing in order with 100 mL of toluene, and then 100 mL of water, and drying at reduced pressure to obtain 17.9 g (a yield of 86%) of the above-identified compound. Melting point: 151° C.

REFERENCE EXAMPLE 4

Synthesis of 4,6-diamino-2-(2-ethylhexylamino-1,3,5-triazine

The same procedure was conducted as in the Reference Example 3 except that 12.9 g (0.1 mol) of 2-ethylhexylamine was employed in place of 29.2 g (0.3 mol) of cyclohexylamine to obtain 18.6 g (a yield of 78%) of a product. Melting point of 81° C.

REFERENCE EXAMPLE 5

Synthesis of 2,4,6-tris(methylamino)-1,3,5-triazine 184.5 g (1.0 mol) of cyanuric chloride was dissolved in 920 g of toluene at room temperature and the mixed solution was cooled to 0° C. The 'solution was dropwise added with 308 g (4.0 mol) of 40%-aqueous solution of methylamine while vigorously stirring. After the completion of dropwise addition, and after maintained at 0° C. for 2 hours while stirring, temperature was gradually elevated to 30° C., and stirring was further conducted for 1 hour. The solution was furthe relevated to 40° C. and stirring was conducted for 2 hours, followed by elevating the temperature to 70° C. While maintaining the solution at 70° C., 46 g of dioxane and 464 g (6.0 mol) of 40%-methylamine aqueous solution were added dropwise, followed by continuing to stir for 9 hours. After cooling to 30° C., 300 g (3.0 mol) of 40%-aqueous solution of sodium hydroxide was added, followed by stirrig for 1 hour, and by further cooling to 5° C. while stirring for 2 hours. A product was filtered, followed by washing with water. The product was dried at 50° C. for 6 hours to obtain 93 g (a yieldof 55%) of the above-identified compound. Melting point: 133° C.

EXAMPLE 1

A 2-liter, 4 necked flask equipped with a stirrer, a thermometer and a condenser was charged with 455 g of 2,4-diamino-6-normalbutylamino-1,3,5-triazine prepared by the method described in the Reference Example 1, 300 g of 40%-formalin, 184.3 g of water, and 455 g of dioxane, followed by adjusting pH to 8.0 by 5%-KOH. Subsequently, temperature was elevated while stirring, followed by allowing to react for 2 hours while maintaining the temperature at 70° C., and by cooling to room temperature. Concentration was conducted at 40° C. and reduced pressure to obtain 540 g of a yellow-colored transparent oily resin composition. The molecular weight of the obtained composition measured by a gel permeation chromatography method (a GPC method) was 580.

EXAMPLE 2

A 2-liter, 4 necked flask was charged with 264.6 g of 2,4,6-tris(normalbutylamino)-1,3,5-triazine obtained by the method described in the Reference Example 2, 150 g of 40%-formalin, 50 g of water, and 150 g of dioxane. In accordance with Example 1, 300 g of a brown-colored oily resin composition were obtained. The molecular weight of the obtained composition measured by a GPC method was 520.

EXAMPLE 3

A 2-liter, 4 necked flask was charged with 520 g of 4,6-diamino-2-cyclohexylamino-1,3,5-triazine obtained by the method described in the Reference Example 3, 300 g of 40%-formalin, 184.3 g of water and 520 g of dioxane. In accordance with Example 1, 589 g of an oily resin composition were obtained. The molecular weight of the obtained composition measured by a GPC method was 720.

EXAMPLE 4

A 2-liter, 4 necked flask was charged with 476 g of 4,6-diamino-2-(2-ethylhexylamino-1,3,5-triazine obtained by the method described in the Reference Example 4, 240 g of 40%-formalin, 147.5 g of water, and 455 g of dioxane. In accordance with Example 1, 589 g of a waxy resin composition were obtained. The molecular weight of the obtained composition measured by a GPC method was 670.

EXAMPLE 5

A 1-liter, 4 necked flask equipped with a stirrer, a thermometer and a condenser was charged with 63 g of melamine, 91 g of 2,4-diamino-6-normalbutylamino-1,3,5-triazine prepared by the method described in the Reference Example 1, 120 g of 40%-formalin, 50 g of water, and 181 g of dioxane, followed by adjusting pH to 9.2 by 10%-NaOH aqueous solution. Subsequently, temperature was elevated while stirring, followed by allowing to react for 90 minutes while maintaining the temperature at 80° C., and then by cooling to room temperature to obtain a transparent liquid. The molecular weight of the obtained liquid measured by a GPC method was 850.

EXAMPLE 6

A 2-liter, 4 necked flask equipped with a stirrer, a thermometer and a condenser was charged with 455 g of 2,4-diamino-6-normalbutylamino-1,3,5-triazine prepared by the method described in the Reference Example 1, 300 g of 40%-formalin, 184.3 g of water, and 455 g of dioxane, followed by adjusting pH to 8.4 by 5%-KOH aqueous solution. Subsequently, temperature was elevated while stirring, followed by allowing to react for 2 hours while maintaining the temperature at 70° C.

A liquid resin was obtained by cooling to room temperature and then by adjusting pH to 9.0 by 5%-KOH. 500 g of the liquid resin was mixed with 500 g of a liquid melamine resin (trade name "Suntop-M700" having resin solid content of 55% manufactured by Nissan Chemical Industries, Ltd.) The liquid resin was stably store for 1 month at room temperature.

EXAMPLE 7

A 2-liter, 4 necked 2flask was charged with 420 g of 2,4,6-tris(methylamino)-1,3,5-triazine obtained by the method in the Reference Example 5, 300 g of 40%-formalin and 360 g of water. In accordance with Example 1, a reaction was conducted. The molecular weight of the obtained product measured by a GPC method was 420.

COMPARATIVE EXAMPLE 1

A 5-liter, 4 necked flask equipped with a stirrer, a thermometer and a condenser was charged with 1260 g of melamine, 1200 g of 40%-formalin, and 1400 g of water, followed by adjusting pH to 8.4 by 10%-KOH. Subsequently, temperature was elevated while stirring, followed by allowing to react for 60 minutes while maintaining the temperature at 95° C. Subsequently, the reaction mixture was cooled to room temperature and its pH was adjusted to 9.0 by 10%-KOH aqueous solution to obtain a transparent water-based resin. The molecular weight of the obtained resin measured by a GPC method was 680.

EVALUATION EXAMPLE 1

A small amount of acetone and 30%-acetone solution of p-toluene sulphonic acid which is a curing agent were added into liquid resins obtained in Examples 1 to 4 in 3% by weight based on the liquid resins to prepare a liquid having low viscosity.

The liquids were impregnated into a chemical-treated filter paper (Trade name "5C" manufactured by Toyo Roshi Kaisha, Ltd.), respectively, followed by drying at 105° C. and removing acetone at to obtain impregnated papers containing 60% of the resins based on the weight of the filter papers. With respect to the Example 5, Example 6 and Comparative Example 1, the respective liquid resins obtained therein were impregnated in filter papers and dried at 105° C. to obtain impregnated papers containing 60% of the resin.

Figure 1:
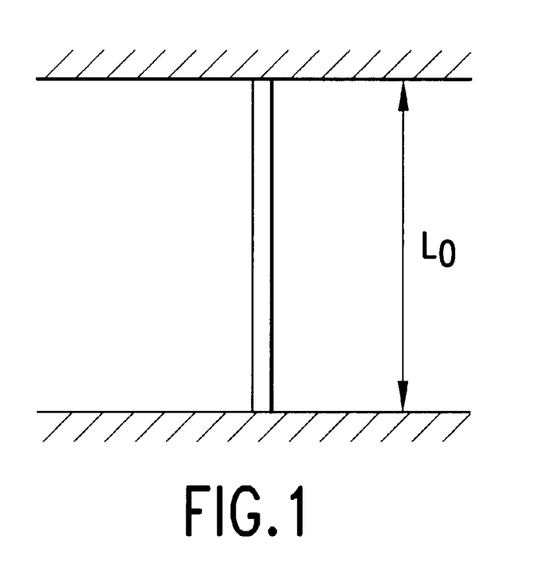
FIG. 1 shows a state before loading in a test for bending property in the present invention.
Figure 2:
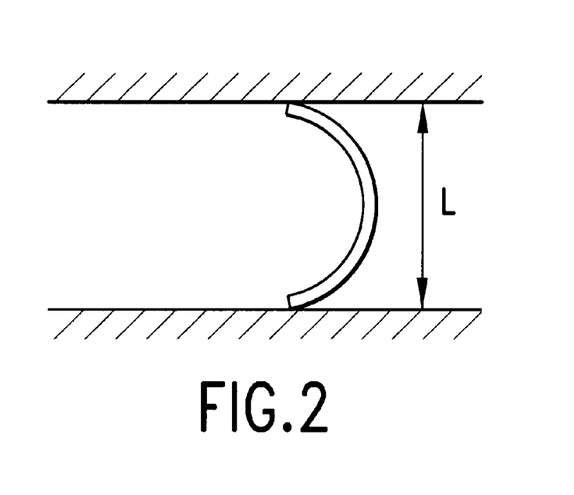
FIG. 2 shows a state in loading in a test for bending property in the present invention.

Respective 5 sheets of impregnated papers obtained were laminated and then hot-pressed under pressure of 10 kg/cm² at 150° C. for 10 minutes to obtain laminated cured sheets having the thickness of 0.8 mm. The laminated sheets were cut into strip-shaped samples having the length of 40 mm, width of 25 mm, and thickness of 0.8 mm. The samples were vertically set in a strength tester (Trade name "Tensilon UCT-10T" manufactured by Orientec Corporation) and bent at a bending speed of 5 mm/minute until fracture.

Bending ability F in the case that original length is $L_0$, and length in fracture is $L_1$ was calculated by $F=(L_0-L_1) \times 100/L_0$.

Results are shown in Table 2.

TABLE 2

|  | Example No. |  |  |  |  |  | Comparative Example |
|---|---|---|---|---|---|---|---|
|  | 1 | 2 | 3 | 4 | 5 | 6 | 1 |
| Bending ability F (%) | 48 | 65 | 52 | 60 | 40 | 41 | 9 |

EVALUATION EXAMPLE 2

30%-aqueous solution of p-toluene sulphonic acid was added into a mixed liquid resin of 200 g of the liquid resin obtained in Example 7 and 800 g of a melamine liquid resin (Trade name "Suntop M700" having solid content of 5%, which is manufactured by Nissan Chemical Industries, Ltd.), and the melamine liquid resin (Trade name "Suntop M700" having solid content of 55%, which is manufactured by Nissan Chemical Industries. Ltd.) alone, respectively, in 3% based on the liquid resin to prepare liquid resins to be impregnated. Respective liquid resins were impregnated into decorated papers in application ratio of 80 g/m², followed by drying at 105° C. to obtain impregnated papers containing 60% of the resins.

3 sheets of respective impregnated papers obtained were laminated, and hot-pressed under pressure of 10 kg/cm² at 150° C. for 10 minutes to obtain laminated thermoset sheets having the thickness of 0.5 mm. In relation to the respective laminated sheets, bending tests were conducted at 120° C., and as a result, although cracks were caused even in 12 mm R in the case of the sheet prepared by the melamine resin alone, cracks were not caused even in 6 mm R in a case of the sheets prepared by impregnating 20% of the resin obtained in the Example 7.

As apparent from the results in the Evaluation Examples 1 and 2, a bending ability and post-forming ability are remarkably higher in the laminated cured sheets prepared by the liquid resins in the Examples than in those of the melamine alone in the Comparative Examples.

POSSIBILITY OF UTILIZATION IN INDUSTRY

As described hereinabove, since the amino resin composition of the present invention has toughness and post-forming ability without loss of properties such as heat resistance, high hardness, and excellent gloss in a melamine resin, it can be utilized as a lamination sheet, a material for decoration, and a material for molding and, further, it can be also utilized in a field of coatings and adhesives for wooden materials having difficulty in adhesion because solubility into organic solvents and a lipophilic property can be given by selecting substituted groups.

We claim:

1. An amino resin composition comprising a reaction product of
    one of or a mixture of more than two triazine derivatives of formula I:

wherein, $R^1$, $R^2$, $R^3$, $R^4$, $R^5$, and $R^6$ each represent an independent substituent, and one to five substituents thereof represent a $C_{1-20}$ alkyl group, a $C_{2-20}$ alkenyl group (the alkyl group or alkenyl group may optionally have an alicyclic structure or phenyl group), or a phenyl group, and the remaining substituent or substituents represent a hydrogen atom, and
    formaldehyde.

2. An amino resin composition as claimed in claim 1, which is prepared by allowing to react formaldehyde in from 1 mol to the same mol number as in unsubstituted hydrogen atom of amino groups in one of or a mixture of more than two triazine derivatives of the formula I based on 1 mol of said one of or said mixture of more than two triazine derivatives of the formula I.

3. An amino resin composition comprising a reaction product of
one of or a mixture of more than two triazine derivatives of formula I:

wherein, $R^1$, $R^2$, $R^3$, $R^4$, $R^5$, and $R^6$ each represents an independent substituent, and one to five substituents represent a $C_{1-20}$ alkyl group or a $C_{2-20}$ alkenyl group (the alkyl group or alkenyl group may optionally have an alicyclic structure or phenyl group), or a phenyl group, and the remaining substituent or substituents a hydrogen atoms and melamine or urea, and formaldehyde.

4. An amino resin composition containing the amino resin composition as claimed in claim 1, a melamine-formaldehyde resin and a melamine/urea-formaldehyde resin or a urea-formaldehyde resin.

5. An amino resin composition containing the amino resin composition as claimed in claim 1, wherein one to three of $R^1$, $R^2$ and $R^6$ among the substituents $R^1$, $R^2$, $R^3$, $R^4$, $R^5$ and $R^6$ represent a $C_{1-10}$ alkyl group and the remaining substituents represent a hydrogen atom.

6. An amino resin composition an claimed in claim 5, wherein one to three of $R^1$, $R^2$ and $R^6$ among the substituents $R^1$, $R^2$, $R^3$, $R^4$, $R^5$ and $R^6$ represent methyl group, ethyl group, n-propyl group, iso-propyl group, n-butyl group, cyclohexyl group or 2-ethylhexyl group, and the remaining substituents represent a hydrogen atom.

7. A decorative sheet, a laminated sheet, a molding compound, a coating or an adhesive containing the amino resin composition as claimed in claim 1.

* * * * *